United States Patent [19]
Drissler

[11] Patent Number: 5,325,453
[45] Date of Patent: Jun. 28, 1994

[54] SIGNAL TRANSMISSION LINE

[75] Inventor: Friedrich Drissler, Stuttgart, Fed. Rep. of Germany

[73] Assignee: Stribel GmbH, Frickenhausen, Fed. Rep. of Germany

[21] Appl. No.: 47,045

[22] Filed: Apr. 12, 1993

Related U.S. Application Data

[63] Continuation of Ser. No. 768,687, filed as PCT/EP91/00299, Feb. 15, 1991, abandoned.

[30] Foreign Application Priority Data

Feb. 17, 1990 [DE] Fed. Rep. of Germany ....... 4005141

[51] Int. Cl.$^5$ .............................................. G02B 6/26
[52] U.S. Cl. ...................................... 385/75; 385/33; 385/46; 385/24
[58] Field of Search ................... 385/33, 34, 75, 88, 385/89, 92, 93, 94, 102, 15, 24, 46; 439/577, 106, 369, 370, 34

[56] References Cited

U.S. PATENT DOCUMENTS

| | | | |
|---|---|---|---|
| 3,270,267 | 8/1966 | Nolte, Jr. ................... | 439/34 |
| 3,494,657 | 2/1970 | Tantlinger et al. .......... | 439/34 |
| 4,119,362 | 10/1978 | Holzman .................... | 385/93 |
| 4,186,996 | 2/1980 | Bowen et al. ............... | 350/96.2 |
| 4,727,248 | 2/1988 | Meur et al. ................. | 385/88 |
| 4,733,934 | 3/1988 | Wais et al. .................. | 350/96.23 |
| 4,762,381 | 8/1988 | Uemiya et al. .............. | 385/51 |
| 4,767,168 | 8/1988 | Grandy ....................... | 385/88 |
| 4,913,511 | 4/1990 | Tabalba et al. .............. | 385/88 |
| 4,979,787 | 12/1990 | Lichtenberger ............ | 385/88 |

FOREIGN PATENT DOCUMENTS

| | | |
|---|---|---|
| 0336167 | 10/1989 | European Pat. Off. . |
| 3109888 | 3/1981 | Fed. Rep. of Germany . |
| 3303624 | 2/1983 | Fed. Rep. of Germany . |
| 3432743 | 9/1984 | Fed. Rep. of Germany . |
| 3517388 | 5/1985 | Fed. Rep. of Germany . |
| 3113168 | 9/1985 | Fed. Rep. of Germany . |
| 246405 | 6/1987 | Fed. Rep. of Germany . |
| 200965 | 6/1983 | German Democratic Rep. . |

Primary Examiner—Rodney B. Bovernick
Assistant Examiner—John Ngo
Attorney, Agent, or Firm—Barry R. Lipsitz

[57] ABSTRACT

In order to provide an optical signal transmission line for transmitting, for example, control, regulating and monitoring signals between units of a technical device, comprising a connection element adapted to be detached from the units and a light wave guide leading away from this connection element for transmitting optical information, which does not have the aforementioned disadvantages of the known detachable connection elements for light wave guides, it is suggested that the signal transmission line operate optoelectronically in that the connection element detachable from the units comprises a detachable electrical connection serving to provide a detachable connection between the signal transmission line and one of the units, that the connection element comprise a transformation unit arranged between the electrical connection and the light wave guide for converting electrical into optical signals and vice versa, and that the connection element keep the electrical connection, the transformation unit and the light wave guide firmly connected to one another.

24 Claims, 3 Drawing Sheets

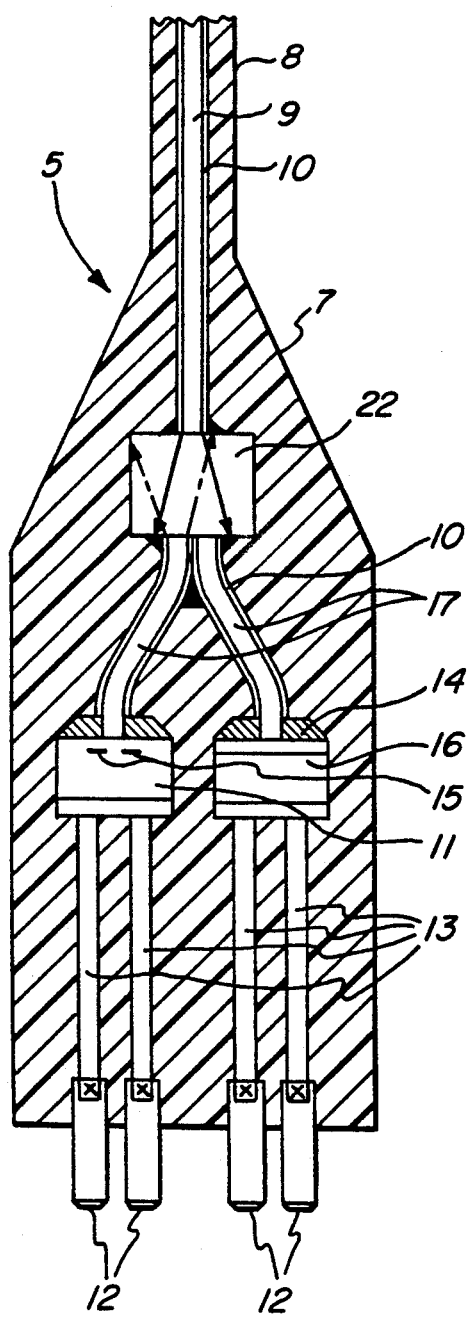
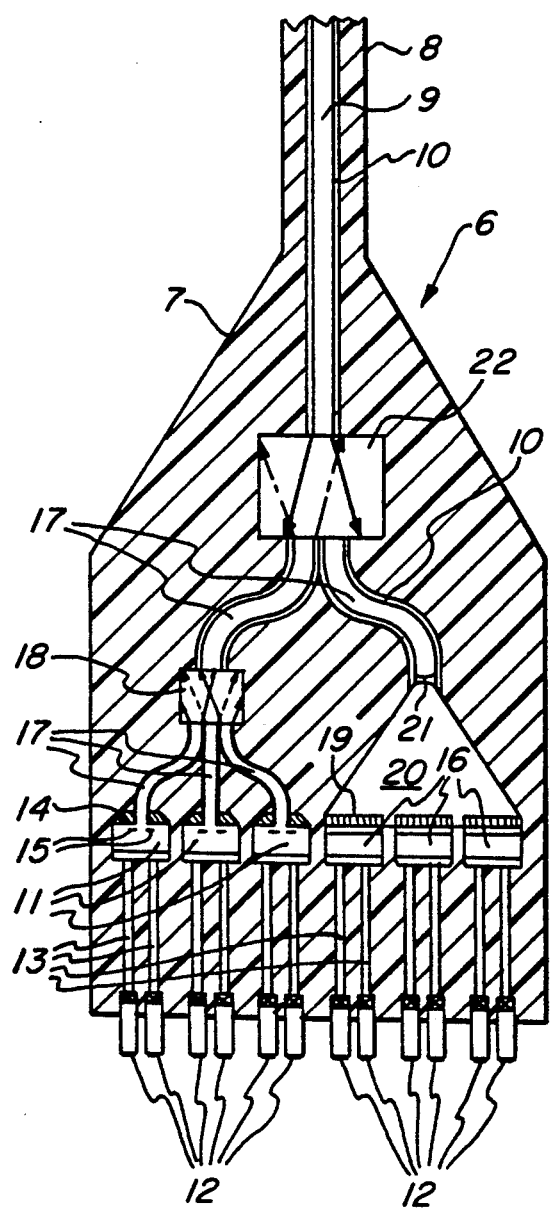

SIGNAL TRANSMISSION LINE

This application is a continuation of commonly assigned, copending U.S. patent application Ser. No. 07/768,687 filed as PCT/EP91/00299, Feb. 15, 1991, now abandoned.

The invention relates to an optical signal transmission line for transmitting control, regulating and monitoring signals between units of a technical device, comprising a connection element adapted to be detached from the units and a light wave guide leading away from this connection element for transmitting optical information.

In the known optical signal transmission lines the individual units of the technical device were provided with a light emission member and/or a light receiving member and the transmission of the signals between the individual units took place optically by means of the light wave guide as transmission element. In this case, the light wave guide had to be connected to the units via detachable connection elements.

Known connection elements of this type, for a detachable connection of a light wave guide with one of the units, in which a light emission member and/or a light receiving member is installed, are, however, unsuitable for various applications. These connection elements for the light wave guide tend to be brittle and impair the optical coupling due to their mechanical properties under operating conditions with continual mechanical stressing or are deteriorated by environmental chemical influences so that the optical properties, i.e. the quality of the optical coupling, are diminished and a permanently faultless functioning is ruled out.

The object underlying the invention is therefore to optically couple various units of a technical device with one another in order to be able to exploit the advantages of the optical signal transmission, in particular its pickup reliability, and yet, on the other hand, to provide detachable connection elements which do not have the aforementioned disadvantages of the known detachable connection elements for light wave guides.

This object is accomplished in accordance with the invention, by an optical signal transmission line of the type described at the outset, in that the signal transmission line operates optoelectronically, that the connection element detachable from the units comprises a detachable electrical connection serving to provide a detachable connection between the signal transmission line and one of the units, that the connection element comprises a transformation unit arranged between the electrical connection and the light wave guide for converting electrical into optical signals and vice versa, and that the connection element keeps the electrical connection, the transformation unit and the light wave guide firmly or undetachably connected to one another.

Due to the inventive solution it is possible for the detachable connection between the units to be made via electrical connections, which do not have the disadvantages of the optical connection elements and of which a great number of variations all fulfilling the aforementioned requirements are generally known, and for the conversion of electrical signals into optical signals not to take place in the respective units before the detachable connection, as in the state of the art, but in the signal transmission line following the detachable connection with the units so that a problem-free permanent connection can be provided between the light wave guide and the transformation unit which does not have to be detachable in design.

The inventive technical device can, for example, be a motor vehicle but any other type of system is also conceivable, in which a plurality of units are to be connected to one another and a mutual control, regulation or monitoring is required. One possibility of designing these units would be for them to be, in a motor vehicle, for example, consumer devices, such as, in particular, adjusting devices. The units can, however, also be sensors.

The inventive detachable connections are electrical plugs or plug jacks but any other type of detachable electrical connection is also conceivable.

In the present invention, the optical signals are transmitted via a light wave guide. This light wave guide can be a glass fiber light wave guide. It is, however, even more advantageous for the light wave guide to be a polymeric light wave guide since this is less brittle and is even better suited as a flexible element of the signal transmission line, in particular for signal transmission in motor vehicles.

The transformation unit preferably comprises a light emission or light receiving member, whereby the light emission member can be a light diode or a semiconductor laser or any other optically radiating component whereas a photodiode can, for example, be used for the light receiving member.

The connection element is preferably designed such that it comprises a sheath which hermetically encloses the connections between the electrical connections of the transformation unit and the light wave guide so that the connection between the light wave guide and the transformation unit as well as between the transformation unit and the electrical connections is not subjected to any external influences.

In a preferred embodiment, the optical signal transmission line for a signal transmission comprises a light emission member, a transmission member and a light receiving member as well as connections for electrical leads, whereby the transmission member comprises a polymeric light wave guide with coupling members provided at the ends and the polymeric light wave guide, the light emission and light receiving members provided in the coupling members as well as the connections are arranged in a hermetic sheath so as to be resistant to vibrations and impervious to light, gas, vapor and liquid.

The optical signal transmission line is designed, in particular, such that it comprises two coupling members and one flexible transmission member located therebetween.

Additional advantageous developments are the subject matter of the subclaims.

Additional features and advantages of the invention are the subject matter of the following description as well as of the drawings of several embodiments. In the drawings, FIG. 1 shows a coupling member of the inventive device with a light emission member, a transmission member and electrical connections in a cutaway side view;

FIG. 5 shows a coupling member similar to FIGS. 1 and 2 but with a light emission member and a light receiving member and FIG. 6 shows a coupling member similar to FIGS. 3 and 4 but with a plurality of light emission and light receiving members for optical signals of differing wave lengths.

Figure 1:
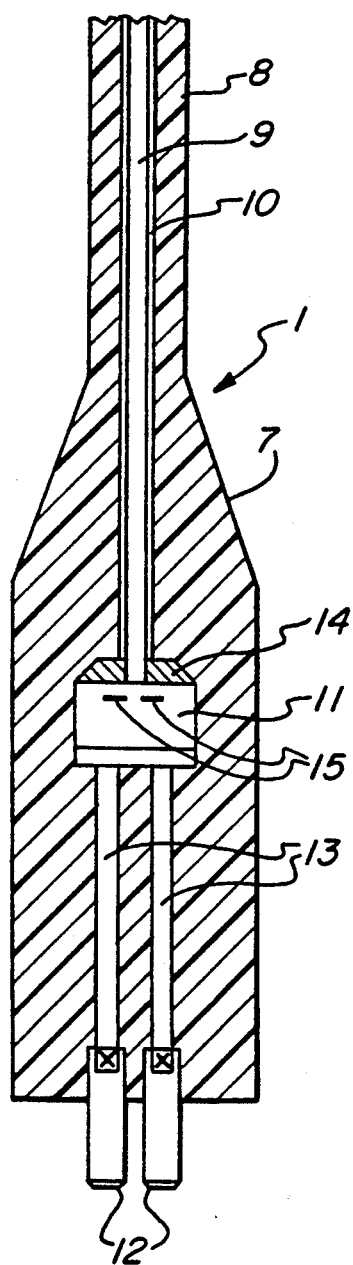

The inventive coupling members 1 to 6 illustrated in the drawings with a transmission member 8 connected thereto are provided for the transmission of optoelectronic signals and can be used, in particular, for controlling, regulating and monitoring the electrical consumer units in technical devices, in particular in motor vehicles, where extreme mechanical stresses, such as oscillations and vibrations, and extreme environmental influences, such as considerable changes in temperature, vapor, water, icing, solar radiation, chemical gases, vapors and liquids from fuels and lubricants, occur or rather can have an effect.

For this purpose, the coupling members 1 to 6 have an outer sheath 7 which is designed such that it hermetically encloses the electrical or electronic and optical components and permanently protects them from the harmful external influences. For the transmission of the signals, one or more light wave guides 9 can be provided in the transmission member 8 which, like the actual coupling members 1 to 6, comprises a hermetic sheath 7. These light wave guides consist of a polymeric material which has both a high optical efficiency for the signal transmission (low-loss total reflection) and a high permanent elasticity or rather permanent flexibility so that, altogether, a high transmission capacity and resistance to vibrations and the like result and, therefore, a reliable, permanent functional capability is ensured. When using a plurality of light wave guides 9 in the transmission member 8, it can be favorable to enclose each individual light wave guide 9 with a sheathing 10 which is impervious to light and prevents any mutual interference of signal transmission.

The coupling member 1 illustrated in FIG. 1 comprises a light emission member 11 which is embedded in the sheath 7 so as to be hermetically sealed and can be designed as a light or laser diode. Two electrical connections 12 are provided at one end of the coupling member 1 and these are arranged so that a portion thereof is hermetically sealed in the sheath 7 and another portion can project out of the sheath 7. In accordance with the illustration, the electrical connections can be appropriately designed as plug tongues. The plug tongues can preferably have a flat, rectangular cross section.

It is, however, also within the scope of the invention to design the plug tongues with a different cross section, for example round or triangular. It is, in addition, within the scope of the invention to design the electrical connections as plug jacks which can also have a flat rectangular, round or other cross section, whereby the plug jacks, like the plug tongues, protrude partially out of the coupling member 1 or can be arranged with their entire length within the coupling member 1.

The connection elements can, with respect to their outer profiling, be designed in a way which prevents the light wave guide transmission cable from being plugged in in an incorrect manner or into an incorrect connection.

Electrical leads 13 are provided between the electrical connections 12 and the light emission member 11, the ends of these leads being securely connected with the aforementioned elements and embedded in the sheath 7 so as to be hermetically sealed.

It is also within the scope of the invention for the electrical connections 12 to be arranged differently so that they lie, for example, transversely to the longitudinal direction of the coupling member 1 and protrude, not at the end face, but, for example, at a longitudinal side. This is, of course, possible in the other coupling members of FIGS. 2 to 6, as well.

On the side of the light emission member 11 remote from the electrical connections, the end of the light wave guide 9 can, for example, be secured by welding or adhesion 14. The light reflecting from the light-emitting surface 15 of the light emission members 11 is, in this way, coupled into the light wave guide 9 which consists preferably of polymeric material.

Figure 2:
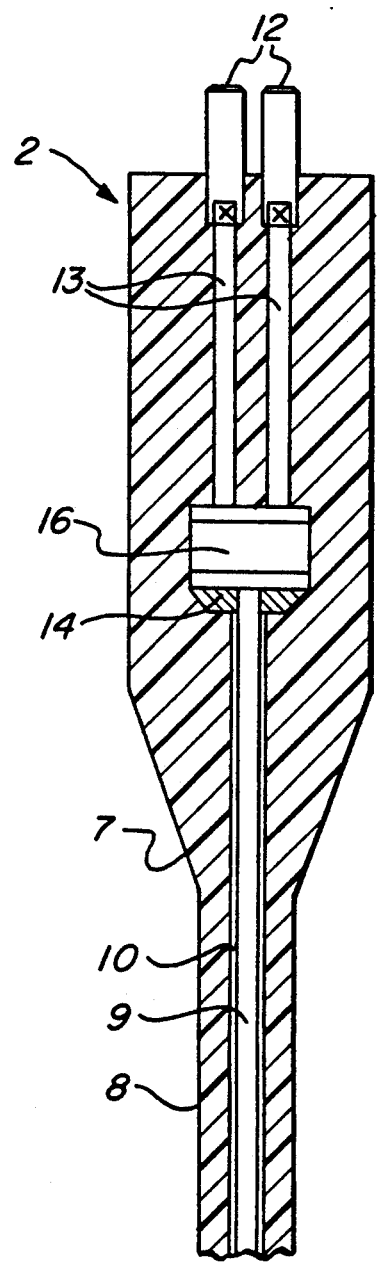
FIG. 2 shows a coupling member similar to FIG. 1 but with a light receiving member.

The coupling member 2 illustrated in FIG. 2 represents the other end of the inventive optoelectronic device, whereby, contrary to the illustrated representation, the transmission member 8 is not, of course, interrupted between the coupling member 1 and the coupling member 2. The coupling member 2 is essentially constructed in exactly the same manner as the coupling member 1 but with the difference that instead of the light emission member 11 a light receiving member 16 is provided. This light receiving member 16 can preferably be a photodiode. The light wave guide 9 can, in the same manner as the coupling member 1, be secured by welding or adhesion 14 to the surface of the light receiving member 16 remote from the electrical connections 12.

The entire optoelectronic signal transmission line according to FIGS. 1 and 2, consisting of the light-emitting coupling member 1, the light-receiving coupling member 2 and the light transmission member 8, is altogether surrounded by the sheath 7 so as to be impervious to light, gas, vapor and liquid such that the optical, optoelectronic and mechanical components are mounted firmly and securely so that despite external environmental influences and external mechanical vibration stresses and the like a reliable functional capability is permanently ensured. The sheath 7 can preferably consist of a rubber elastic or toughened elastic material, in particular a plastic material, which is resistant to the aforementioned environmental influences. In this respect it can also be favorable to design the sheath 7 to be more elastic in the region of the transmission member 8 than at the coupling members 1 to 6. The electrical connections 12 of the coupling members 1 to 6 can, in addition, be arranged such that the coupling members themselves can be plugged in only in an exactly predetermined position so that an incorrect connection is certainly avoided.

A continuous beam of light can, for example, be used for signal transmission by way of the optoelectronic signal transmission line according to FIGS. 1 and 2. It is, however, also possible, according to requirements, to use light having a special wave length or digitally pulsed light having a special code and/or a particular wave length (color).

Figure 3:
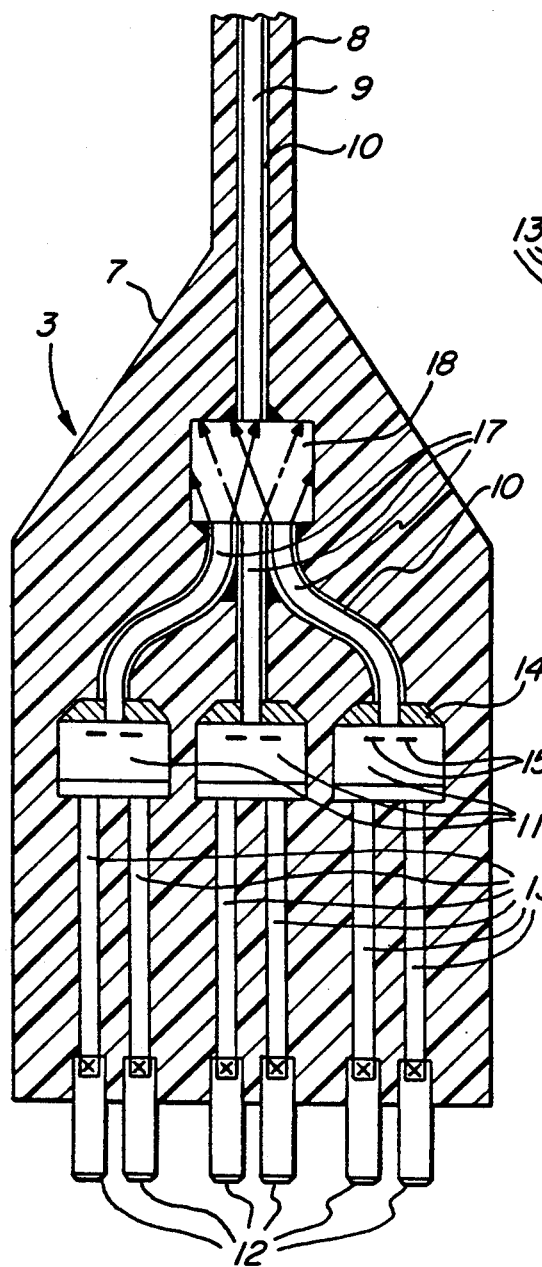
FIG. 3 shows a coupling member similar to FIG. 1 but with a plurality of light emission members for optical signals of differing wave lengths.
Figure 4:
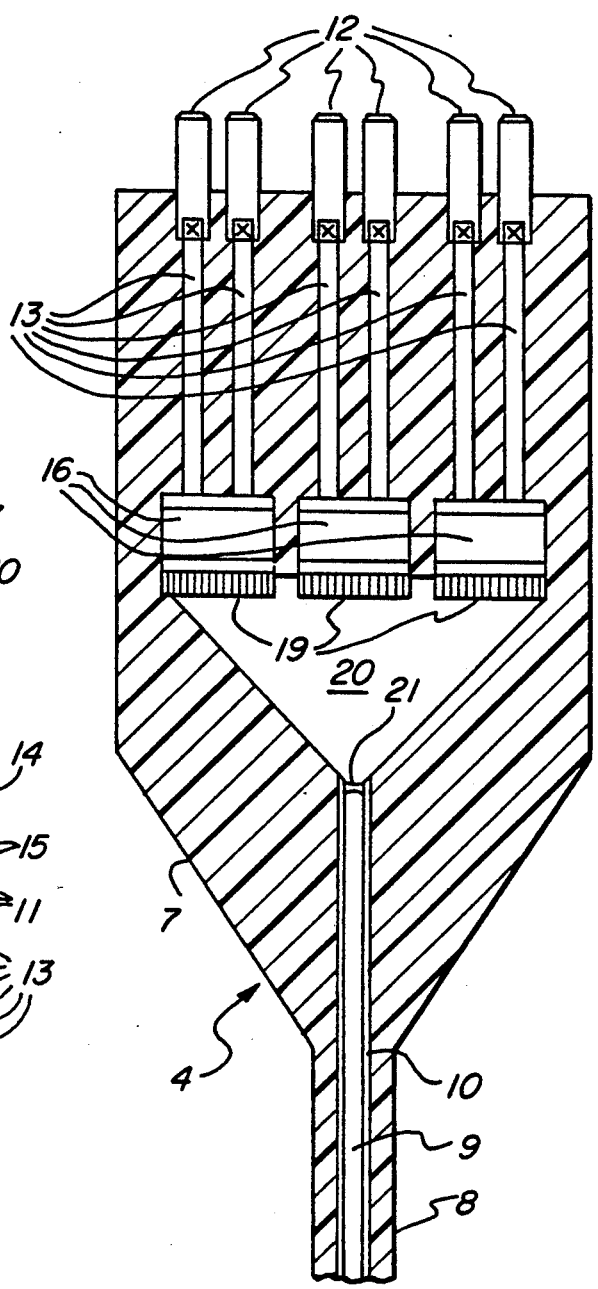
FIG. 4 shows a coupling member similar to FIG. 2 but with a plurality of light receiving members for optical signals of differing wave lengths.

The optoelectronic signal transmission line according to the embodiment of FIGS. 3 and 4 has a coupling member 3 (FIG. 3) and a coupling member 4 (FIG. 4) which can be connected via the transmission member 8 which is illustrated as being interrupted. Three light emission members 11 are located in the coupling member 3 and these can preferably be arranged next to one another. It is also possible to provide fewer or more light emission members 11 in the coupling member 3. The light emission members 11 can emit differing light wave lengths. In this respect, they can be light sources of varying color or also light sources having a continuous spectral pattern which can be provided with certain filters. Light wave guide intermediate members 17 can be arranged on the side of the three light emission members 11 opposite the electrical connections 12 which are led out at the end face of the coupling member 3. The ends of these intermediate members can be secured to the surfaces of the light emission members 11 by welding or adhesion 14. The light wave guide intermediate members 17 can be arranged with their other ends at an optical coupling element 18, which is, for example, designed as a mixer platelet, such that the light signals are coupled into one or several optical fibers or light wave guides 9.

The other coupling member 4 has, according to FIG. 4, three light receiving members 16 which can preferably be arranged next to one another. The light receiving members 16 which are preferably designed as photodiodes can have optical filters 19 on the side remote from the light wave guide 9 and these filters ensure the correct reception of light signals for each individual photodetector.

The optical filters 19 of the light receiving members 16 can be provided on the enlarged side of a light distribution chamber 20 approximately funnel-shaped in design. This chamber tapers in the direction towards the light-emitting end of the polymeric light wave guide 9. An optical element designed, for example, as a lens 21 can be provided at the light-emitting end of the light wave guide 9 in the region of this tapering of the funnel-shaped chamber 20. The light transmitted from the coupling member 3 to the coupling member 4 can be expanded in a suitable manner by way of the lens 21 such that a faultless functioning of all the light receiving members 16 within the coupling member 4 is guaranteed. According to another preferred embodiment of the coupling member 4, which is not illustrated, it is also possible to spatially distribute the wave-length composition of the incoming light by means of an optical component designed, for example, as a prism, such that the light is fed in this manner either directly or via a light wave guide intermediate member to a specific photodiode 16.

The transmitting and receiving coupling members 3, 4 as well as the transmission member 8 of the optoelectronic device can, as in the device according to FIGS. 1 and 2, be completely enclosed by a sheath 7 impervious to light, gas, vapor and liquid. This sheath protects the polymeric light wave guide 9 and the components 10 to 21 reliably against external influences. Likewise, the coupling members 3, 4 with the protruding connection plugs 12 can be constructed such that they can only be plugged in in the correct position, which prevents any erroneous connection.

The coupling member 5 according to FIG. 5 represents an additional, preferred embodiment and is part of an optoelectronic device consisting of two such coupling members 5 which are connected with one another via the transmission member 8. This means that the optoelectronic device has identical coupling members 5 at both ends of the transmission member 8 and these are designed such that the signal can be transmitted bidirectionally. For this purpose, at least one light emitting member 11, preferably a light or laser diode, and at least one light receiving member 16, preferably a photodiode, are provided in the coupling member 5. In addition, an optical mixer member 22 is located in the coupling member 5. A light wave guide intermediate member 17 is located between the mixer member 22 and the light emission member 11. This intermediate member can be secured to the light emission member 11 by welding or adhesion 14. A second light wave guide intermediate member 17 is arranged between the mixer member 22 and the light receiving member 16, whereby the end of this light wave guide intermediate members is also connected to the light receiving member 16 by welding or adhesion 14. The mixer member 22 has the effect that the light emitted from the light emission member 11 is coupled into the light transmission member 8 and that, simultaneously, the incoming signals reach the light receiving member 16. In this respect, use is made of the numerical focal apertures specific to the light wave guide 9 and the light wave guide intermediate members 17.

The light wave guide intermediate members 17 can, like the light wave guide 9, be enclosed by a sheath 10 to rule out any mutual interferences. Other forms of optical coupling between the light transmission member 8 and the light emission member 11 as well as the light receiving member 16 are also possible due to modified constructions and come within the scope of the invention.

The coupling member 5 can, with respect to the connection plugs 12, be expediently designed such that any confusion is ruled out and the correct plug contacting is always ensured.

The hermetic sheath 7 ensures that the optical, optoelectronic and electrical components of the coupling member 5 are protected against damaging external influences and are arranged within the sheath 7 such that their mechanical mounting ensures safe functioning.

A further, preferred embodiment for a bidirectional transmission of information is provided by the coupling member 6 illustrated in FIG. 6. The coupling member 6 comprises in the hermetically sealed sheath 7 three light emission members 11 and three light receiving members 16, whereby it is, of course, also possible within the scope of the invention to provide fewer or more light emission members 11 and light receiving members 16. For the correct transmission of the signals, an optical coupling element designed, for example, as mixer member 22 is additionally located in the coupling member 6 and the light wave guide 9 is connected to this coupling element. Two light wave guide intermediate members 17 are connected on the side of the mixer member 22 opposite the light wave guide 9. One of these intermediate members opens into a preferably funnel-shaped chamber 20, whereby a lens 21 can be provided at the mouth opening. The light receiving members 16 which also limit the chamber 20 can have different optical filters 19.

The other light wave guide intermediate member 17 connected to the mixer member 22 is connected to one side of an optical coupling element 18. Three additional light wave guide intermediate members 17 can be connected to the opposite side of the coupling element 18 and these intermediate members can be connected to the three light emission members 11 at the light-emitting surface 15 by way of welding or adhesion 14. Furthermore, electrical leads 13 are arranged on the light emission members 11 and light receiving members 16 and these lead to the electrical connection plugs 12 protruding at the end face of the coupling member 6. The complete optoelectronic device of the type last described has two identical coupling members 6 which are connected via the light transmission member 8. Both the coupling members 6 and the transmission member 8 are completely enclosed so as to be hermetically sealed by the sheath 7 designed from a material or material combinations, which are impervious to light, gas, vapor and liquid, so that the optoelectronic components in the coupling members 6 and the transmission member 8 are optimally protected. The interior shape of the sheath 7 ensures that all the optoelectronic components are securely embedded for a permanently faultless functioning.

An essential advantage of the inventive device is to be seen in the fact that it can be used in vehicles as well, in particular motor vehicles, for transmitting information under the prevailing conditions with polymeric light wave guides. Moreover, the described optoelectronic coupling members 1 to 6 with the transmission members 8 enable the use of polymeric light wave guides 9 for transmitting information, in particular, in surroundings in which aggressive external influences, in particular of a chemical nature, prevail. These influences lead in the known optoelectronic devices to damage of the components provided for the transmission.

I claim:

1. An optical signal transmission line for communicating signals between units of a technical device, comprising:
   a polymeric light wave guide for carrying optical signals between first and second ends thereof, said polymeric light wave guide being provided with a light impervious first sheathing;
   a first connection element at the first end of said polymeric light wave guide adapted to provide a detachable electrical connection between the signal transmission line and one of said units, said first connection element bearing at least one electrical plug or plug jack for allowing said detachable electrical connection to be made;
   a transformation unit provided in said first connection element for converting electrical signals received at said detachable electrical connection into optical signals for communication over said polymeric light wave guide and/or for converting optical signals received from said wave guide into electric signals for output from said detachable electrical connection; and
   a continuous outer second sheath for hermetically sealing said first connection element and said polymeric wave guide including said light impervious first sheathing against environmental influence from said first end to said second end, to provide an integrated hermetically sealed assembly.

2. Signal transmission line as defined in claim 1, wherein the transformation unit comprises at least one of a light emission member and a light receiving member.

3. Signal transmission line as defined in claim 1, wherein electrical leads are provided between the detachable electrical connection and the transformation unit, the ends of said leads being securely connected and embedded in the outer second sheath so as to be hermetically sealed.

4. Signal transmission line as defined in claim 1, wherein the outer second sheath provided resistance to vibrations and is impervious to light, gas, vapor and liquid.

5. Signal transmission line as defined in claim 1, wherein the first connection element comprises a coupling member and the light wave guide comprises a flexible transmission member.

6. Signal transmission line as defined in claim 5, wherein the transmission member comprises two or more light wave guides.

7. Signal transmission line as defined in claim 1, wherein the first connection element provides at least one rectangular plug tongue having a flat cross section which is led out of the outer second sheath.

8. Signal transmission line as defined in claim 1, wherein the light wave guide is encased individually or as a fiber bundle so as to be lightproof.

9. Signal transmission line as defied in claim 1, wherein two or more light receiving members are arranged in the first connection element.

10. Signal transmission line as defined in claim 1, wherein a preferably funnel-shaped light distribution chamber is arranged between a light-emitting end of the polymeric light wave guide and a light receiving member of said transformation unit.

11. Signal transmission line as defined in claim 1, wherein light receiving members comprising various optical filters are provided in the first connection element.

12. Signal transmission line as defined in claim 1, wherein light is adapted to be continuously transmitted via said polymeric light wave guide with at least one of a differing wave length and a differing intensity.

13. Signal transmission line as defined in claim 1, wherein light is adapted to be transmitted as pulses via said polymeric light wave guide with at least one of a differing wave length and a differing intensity.

14. Signal transmission line as defined in claim 1, wherein a lens is provided at a light-emitting end of the polymeric light wave guide.

15. Signal transmission line as defined in claim 1, wherein an optical element separating colors is provided at a light-emitting end of the polymeric light wave guide for spatial distribution of emitted light.

16. An optical signal transmission line for communicating signals between units of a technical device, comprising:
   a polymeric light wave guide for carrying optical signals between first and second ends thereof;
   a first connection element at the first end of said polymeric light wave guide adapted to provide a detachable electrical connection between the signal transmission line and one of said units;
   a first transformation unit provided in said first connection element for converting electrical signals received at said electrical connection into optical signals for communication over said polymeric light wave guide and/or for converting optical signals received from said wave guide into electrical signals for output from said electrical connection;
   a second connection element at the second end of said polymeric wave guide adapted to provide a second detachable electrical connection between the signal transmission line and one of said units;
   a second transformation unit provided in said second connection element for converting optical signals received from said wave guide into electrical signals for output from said second electrical connection and/or for converting electrical signals received from said second electrical connection into optical signals for communication over said wave guide; and a continuous sheath for hermetically sealing both of said connection elements and said polymeric wave guide between said connection elements to provide an integrated hermetically sealed assembly.

17. Signal transmission line as defined in claim 16, wherein a light emission member is arranged in one of the transformation units and a light receiving member is arranged in the other transformation unit.

18. Signal transmission line as defined in claim 17, wherein a light emission member and a light receiving member are arranged in each of the two transformation units.

19. An optical signal transmission line for communicating signals between units of a technical device, comprising:
a polymeric light wave guide for carrying optical signals between first and second ends thereof, said polymeric light wave guide being provided with a light impervious first sheathing;
a first connection element at the first end of said polymeric light wave guide adapted to provide a detachable electrical connection between the signal transmission line and one of said units, said first connection element including at least one electrical plug or plug jack for allowing said detachable electrical connection to be made;
a transformation unit provided in said first connection element and coupled to said at least one electrical plug or plug jack by at least one electrically conductive lead, for converting electrical signals received at said detachable electrical connection into optical signals for communication over said polymeric light wave guide and/or for converting optical signals received from said wave guide into electrical signals for output from said detachable electrical connection; and
a continuous outer second sheath impervious to gas, vapor and liquid for hermetically sealing said polymeric wave guide from said first end to said second end;
wherein said outer second sheath hermetically seals said first connection element by embedding said at least one plug or plug jack, said at least one electrically conductive lead and said transformation unit therewith to provide an integrated hermetically sealed assembly.

20. An optical signal transmission line for communicating signals between units of a technical device, comprising:
a polymeric light wave guide for carrying optical signals between first and second ends thereof;
a connection element at the first end of said polymeric light wave guide adapted to provide a detachable electrical connection between the signal transmission line and one of said units, said connection element bearing at least one electrical plug or plug jack for allowing said detachable electrical connection to be made;
a transformation unit provided in said connection element for converting electrical signals received at said detachable electrical connection into optical signals for communication over said polymeric light wave guide and/or for converting optical signals received from said wave guide into electrical signals for output from said detachable electrical connection; and
a continuous sheath for hermetically sealing said connection element and said polymeric wave guide against environmental influence from said first end to said second end, to provide an integrated hermetically sealed assembly;
wherein said connection element includes a mixer member connected to the polymeric light wave guide, a first light wave guide intermediate member joined to a light emission member, and a second light wave guide intermediate member jointed to a light receiving member.

21. An optical signal transmission line for communicating signals between units of a technical device, comprising:
a polymeric light wave guide for carrying optical signals between first and second ends thereof;
a connection element at the first end of said polymeric light wave guide adapted to provide a detachable electrical connection between the signal transmission lien and one of said units, said connection element bearing at least one electrical plug or plug jack for allowing said detachable electrical connection to be made;
a transformation unit provided in said connection element for converting electrical signals received at said detachable electrical connection into optical signals for communication over said polymeric light wave guide and/or for converting optical signals received from said wave guide into electrical signals for output from said detachable electrical connection, said transformation unit containing two or more light emission members each provided with a light wave guide intermediate member leading to a mixer member coupled to the polymeric light wave guide; and
a continuous sheath for hermetically sealing said connection element and said polymeric wave guide against environmental influence from said first end to said second end, to provide an integrated hermetically sealed assembly.

22. An optical signal transmission line for communicating signals between units of a technical device, comprising:
a polymeric light wave guide for carrying optical signals between first and second ends thereof, said polymeric wave guide including a light-emitting end;
an optical element separating colors being provided at the light-emitting end of said polymeric light wave guide for spatial distribution of emitted light;
a connection element at the first end of said polymeric light wage guide adapted to provide a detachable electrical connection between the signal transmission line and one of said units, said connection element bearing at least one electrical plug or plug jack for allowing said detachable electrical connection to be made;
a transformation unit provided in said connection element for converting electrical signals received at said detachable electrical connection into optical signals for communication over said polymeric light wave guide and/or for converting optical signals received from said wave guide into electrical signals for output from said detachable electrical connection; and a continuous sheath for hermetically sealing said connection element and said polymeric wave guide against environmental influence from said first end to said second end, to provide an integrated hermetically sealed assembly;

wherein light wave guide intermediate members are provided leading from the optical element separating colors to various light receiving members in said transformation unit.

23. An optical signal transmission line for communicating signals between units of a technical device, comprising:

a polymeric light wave guide for carrying optical signals between first and second ends thereof;

a connection element at the first end of said polymeric light wave guide adapted to provide a detachable electrical connection between the signal transmission line and one of said units, said connection element bearing at least one electrical plug or plug jack for allowing said detachable electrical connection to be made;

a transformation unit provided in said connection element for converting electrical signals received at said detachable electrical connection into optical signals for communication over said polymeric light wave guide and/or for converting optical signals received from said wave guide into electrical signals for output from said detachable electrical connection; and a continuous sheath for hermetically sealing said connection element and said polymeric wave guide against environmental influence from said first end to said second end, to provide an integrated hermetically sealed assembly;

wherein said connection element includes at least two light emission members and at least two light receiving members as well as one mixer member, said mixer member being connected to the polymeric light wave guide, and at least two light wave guide intermediate members are connected to the mixer member, one of said intermediate members being associated with the light receiving members and the other with the light emission members.

24. Signal transmission line as defined in claim 23 wherein the light wave guide intermediate member associated with the light emission members is connected to an optical coupling element, said element being connected via additional light wave guide intermediate members with the light emission members.

* * * * *